US010826685B1

(12) United States Patent
Campagna (10) Patent No.: US 10,826,685 B1
(45) Date of Patent: Nov. 3, 2020

(54) COMBINED BLOCKCHAIN INTEGRITY (71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 183 days.

(21) Appl. No.: 15/195,803

(22) Filed: Jun. 28, 2016

(51) Int. Cl.
H04L 9/06 (2006.01)
H04L 9/32 (2006.01)
H04L 29/08 (2006.01)

(52) U.S. Cl.
CPC .......... H04L 9/0643 (2013.01); H04L 9/0637 (2013.01); H04L 9/3239 (2013.01); H04L 9/3247 (2013.01); H04L 67/02 (2013.01); H04L 67/1097 (2013.01)

(58) Field of Classification Search
CPC ... H04L 9/0643; H04L 9/0637; H04L 9/3239; H04L 9/3247; H04L 67/02; H04L 67/1097
USPC ........................................................ 713/176
See application file for complete search history.

(56) References Cited

U.S. PATENT DOCUMENTS

| | | | | |
|---|---|---|---|---|
| 9,298,806 B1* | 3/2016 | Vessenes | ................ | G06Q 30/00 |
| 9,397,985 B1* | 7/2016 | Seger, II | ............ | H04L 63/0442 |
| 9,608,829 B2* | 3/2017 | Spanos | ................ | H04L 9/3297 |
| 9,892,460 B1* | 2/2018 | Winklevoss | ............ | G06Q 40/04 |
| 10,554,746 B2* | 2/2020 | Bathen | ................... | H04L 9/3247 |
| 10,642,967 B2* | 5/2020 | Balaraman | ............ | G06F 16/958 |
| 2015/0220928 A1* | 8/2015 | Allen | ................. | G06Q 20/0655 705/67 |
| 2015/0244690 A1* | 8/2015 | Mossbarger | .......... | H04L 63/061 713/171 |
| 2015/0269570 A1* | 9/2015 | Phan | .................. | G06O 20/3276 705/71 |
| 2016/0028552 A1* | 1/2016 | Spanos | ................. | H04L 9/3297 713/178 |
| 2016/0218879 A1* | 7/2016 | Ferrin | ................... | H04L 9/3247 |
| 2016/0224949 A1* | 8/2016 | Thomas | ............... | G06Q 20/027 |
| 2016/0253663 A1* | 9/2016 | Clark | ..................... | G06Q 20/02 705/75 |
| 2016/0292672 A1* | 10/2016 | Fay | ...................... | G06Q 20/363 |
| 2016/0330034 A1* | 11/2016 | Back | ...................... | G06Q 20/06 |
| 2016/0342977 A1* | 11/2016 | Lam | ...................... | G06Q 20/02 |

(Continued)

OTHER PUBLICATIONS

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

Primary Examiner — Jahangir Kabir
(74) Attorney, Agent, or Firm — Davis Wright Tremaine LLP (57) ABSTRACT One or more systems implement a plurality of blockchains to track event data. The plurality of blockchains are arranged in tiered form, and the content and/or integrity of blockchains in higher tiers depends on, or at least derives from, the content and/or integrity of the blockchains in lower tiers. Depending on the specific structure and implementation, assurances, verifications, and the like may be provided for services and other resources using such blockchains in a repeatable manner.

20 Claims, 7 Drawing Sheets (56) References Cited

U.S. PATENT DOCUMENTS

| | | | |
|---|---|---|---|
| 2016/0358253 A1* | 12/2016 | Liao | G06Q 40/04 |
| 2016/0379212 A1* | 12/2016 | Bowman | G06Q 20/38215 |
| | | | 705/71 |
| 2017/0054611 A1* | 2/2017 | Tiell | G06F 17/30598 |
| 2017/0132625 A1* | 5/2017 | Kennedy | G06Q 20/065 |
| 2017/0148016 A1* | 5/2017 | Davis | G06Q 20/3827 |
| 2017/0180134 A1* | 6/2017 | King | H04L 9/3247 |
| 2017/0206382 A1* | 7/2017 | Rodriguez De Castro | |
| | | | G06F 21/76 |
| 2017/0228731 A1* | 8/2017 | Sheng | G06Q 20/401 |
| 2017/0237570 A1* | 8/2017 | Vandervort | H04L 63/0442 |
| | | | 713/176 |
| 2017/0278186 A1* | 9/2017 | Creighton, IV | G06Q 40/04 |
| 2017/0293669 A1* | 10/2017 | Madhavan | G06F 17/30578 |
| 2017/0300627 A1* | 10/2017 | Giordano | H04L 63/102 |
| 2017/0352033 A1* | 12/2017 | Buckman | G06Q 20/401 |
| 2017/0359374 A1* | 12/2017 | Smith | G06F 21/57 |
| 2019/0258991 A1* | 8/2019 | Nguyen | G06F 16/182 |
| 2019/0303579 A1* | 10/2019 | Reddy | G06F 21/57 |
| 2019/0305957 A1* | 10/2019 | Reddy | G06F 21/645 |

\* cited by examiner

COMBINED BLOCKCHAIN INTEGRITY

BACKGROUND

Distributed computing and storage systems and services, such as those provided by computing resource service providers (e.g., over the Internet), are increasingly utilized by enterprises and individual users to augment, and in some cases, replace on-premise computing resources. However, as such distributed systems and services are not necessarily under complete control of the implementing user or enterprise, the integrity of transactions made therewith can be difficult to ascertain (from the perspective of the user), and difficult for which to provide assurances (from the perspective of the service provider).

BRIEF DESCRIPTION OF THE DRAWINGS

Various techniques will be described with reference to the drawings, in which.

DETAILED DESCRIPTION

In one example, a computing resource service provider implements a plurality of services, several examples of which are provided herein. The services are made available to customers of the computing resource service provider, such as via an Internet or other network connection between a customer device and the computing resource service provider (e.g., via a webservice call or application programming interface call). Information regarding data, requests, and other interactions between customer devices, other services, etc. and the services are recorded as audit logs or other event data. Such audit logs or other event data may be made available to requestors, such as customer devices, via the service (or a different service, such as an audit service), for auditing or other verification purposes.

The overall veracity and/or integrity of the audit logs or other event data, and in fact their trustworthiness as logs or other data accurately reflecting the history of service interactions, depends on one or more assurances the system can provide regarding their provenance and data integrity. One way in which to provide such assurances is to use a distributed database, such as a blockchain, that requires proof of work reflecting integrity data and/or calculations performed by any entity attempting to add such event data or records to the blockchain, e.g., by adding blocks of transactions during a specific period of time to the blockchain.

The proof of work is, in some examples, the outcome of performing a cryptographic hash function, such as SHA-256, on the event data being committed and header data, which can include a counter so as to change the outcome with each iteration performed. The blockchain (or implementing system) may require that the outcome meets specific criteria, such as requiring a specified number of leading binary or hexadecimal zeros in the outcome. Such criteria may be tuned or otherwise set to ensure that the number of iterations required of the submitting entity is computationally large or difficult enough to make submissions, and thus back-propagated changes, exceedingly difficult (e.g., as a property of the blockchain, the header of a given block includes the proof of work outcome of the previous block, and thus a proof of work for all blocks after a given block would need to be recalculated in sequence as the resultant value of the computation of the next block would differ).

In this example, this property of blockchains as implemented above can be tiered to enforce a level of trust not just for event data committed for a given service, but also across multiple services of a given service provider, as well as between service providers. For example, the proofs of work in each block of individual private (e.g., service-specific) blockchain can be "rolled up" into a provider-wide blockchain, such that the proofs of work of blocks across multiple services of a service provider created within a specified period of time are themselves populated in a block of a provider blockchain, which may operate similarly to the service (private) blockchains. Accordingly, any unauthorized changes, corrupt data, incorrect blocks, etc., of any of the service blockchains would alter the corresponding block of the provider blockchain, as well as any subsequent blocks in the provider blockchain. As may be contemplated, a simple affirmation of the validity of one or more blocks of the service provider blockchain strongly implies that the event data and/or the blocks of any/all of the service (private) blockchains rolled up into the provider blockchain is valid.

Further tiering of blockchains may be performed across multiple computing service resource providers, so as to provide a higher level of assurance across multiple computing service resource providers, as each computing resource service provider participating in a combined, multi-provider blockchain would have an interest in maintaining the integrity of its respective blockchain, as well as that of the service(s) running on that respective platform. Furthermore, any attempt at altering the event data contained therein would necessitate a recalculation not only of the blocks of the blockchains within control of a given computing resource service provider, but also some or all subsequent blocks of blockchains maintained by other computing resource service providers.

In some examples, the act of "rolling up" data from private blockchains into blockchains of higher tiers, e.g., service or provider blockchains, includes anonymization of the event data. The use of cryptographic hash functions, such as SHA-256, to calculate the proof of work, effectively obfuscates the data from blockchains in higher tiers of the structure, if the proof of work (and not the event data itself) is used as the data payload within the blocks of the higher blockchains. However, some implementations use the event data itself in multiple (or all) tiers of a tiered blockchain structure.

The explicit and implied assurances, as well as the integrity checking functionality, enabled by the use of blockchains (and tiered blockchains) to store or otherwise represent audit logs and other event data is, in some examples, made available to a requestor, such as a customer device. Such exposure may be made by way of an appropriate interface, such as an application programming interface (API), webservice call, user interface, or the like. It will be appreciated that different levels of integrity checks or verification may be made at different tiers of the tiered blockchain structure.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
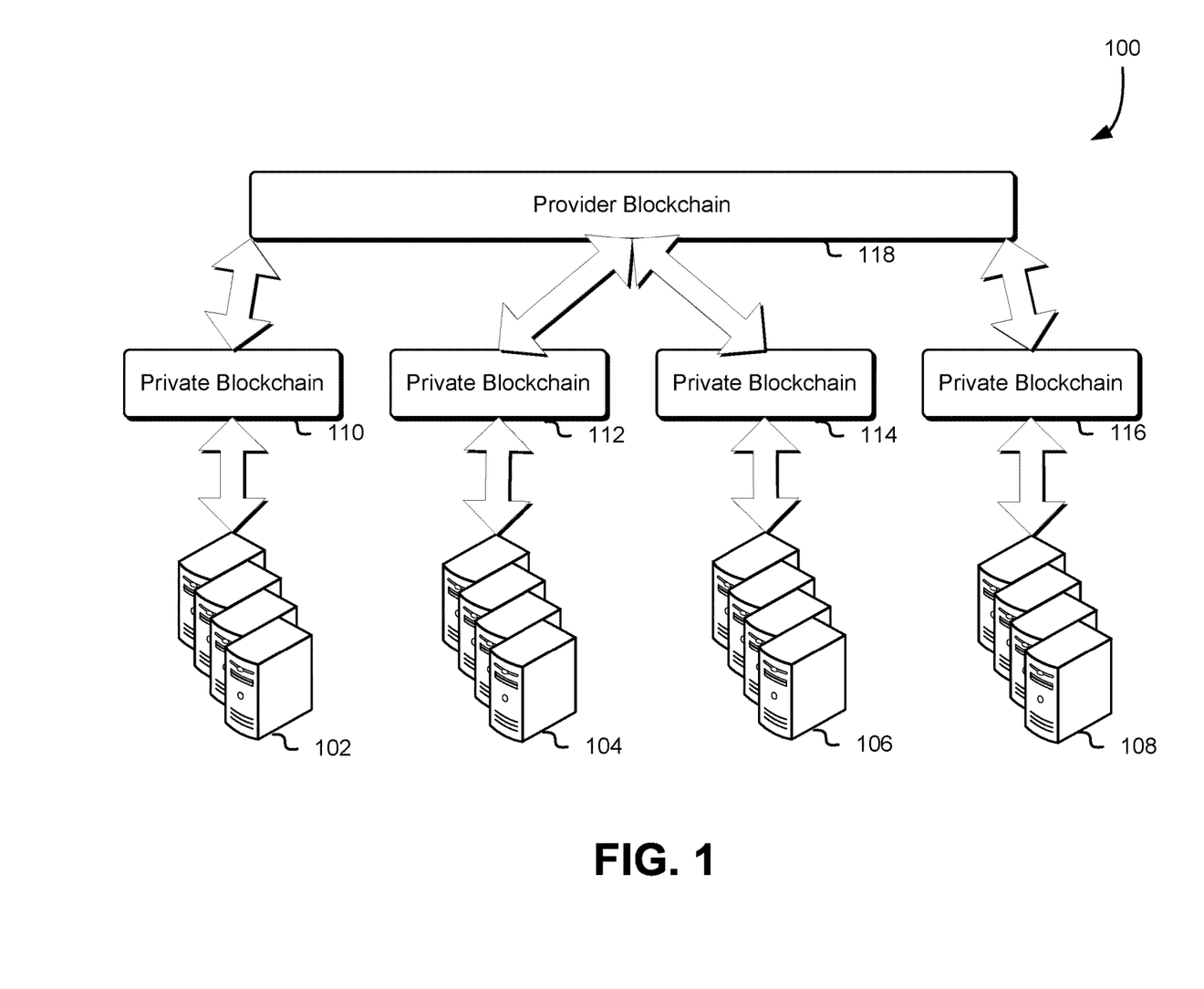
FIG. 1 illustrates an environment implementing multiple private blockchains and a provider blockchain to verify integrity of event data committed to the private blockchains, in accordance with some embodiments.

FIG. 1 illustrates an environment implementing multiple private blockchains and a provider blockchain to verify integrity of event data committed to the private blockchains, in accordance with some embodiments.

A plurality of services or other resources 102, 104, 106, and 108, provided by a computing resource service provider, interacts with one or more customer devices or other entities. The manner of such interaction is described in further detail in connection with at least FIGS. 6 and 7 below. For example, a customer device may interact (e.g., transact data, requests, etc.) with one or more services, via an API, webservice call, user interface, or the like, using one or more networks (such as the Internet). As another example, one service may similarly interact with another service in a similar fashion. As yet another example, another resource of a computing resource service provider, such as a management component or control plane, may interact with the service for maintenance, confirmation, system update, or other similar purposes.

In some embodiments, such interactions result in event data, such as audit logs. Event data may include any data or metadata related to the interaction, and in some cases can include some or all of the data actually involved in the interaction. Examples include access timestamps, length of session, identity of accessor, nature of transaction, some or all of the transacted data, Internet Protocol (IP) address or other network identifier of the requestor, and the like.

The event data may be generated by one or more resources of (or associated with) the service itself. In some embodiments, the event data is generated by a different resource or set of resources of the computing resource service provider, such as those not allocated to operation of the service as described in further detail below. The overall veracity and/or integrity of the audit logs or other event data, and in fact their trustworthiness as logs or other data accurately reflecting the history of service interactions, depends on one or more assurances provided to, e.g., customers of the service and/or the computing resources service provider regarding the provenance of the event data and/or integrity of the event data. Toward this end, each service 102, 104, 106, 108, maintains (or has maintained on its behalf) a respective private blockchain 110, 112, 114, 116 that includes, in some embodiments, some or all of the generated event data. In some embodiments, the event data is generated by the same resources/components as those that commit the event data to the blockchain. In some embodiments, the event data is generated by a different set of resources/components than those that generate the event data. As may be contemplated, the maintenance of the event data (e.g., commission into blocks of a given blockchain) may be performed by a service provided by the computing resource service provider.

A given private blockchain 110 may be specific to a customer or customer device. For example, each private blockchain 110, 112, 114, 116 may relate to transactions with the same service or set of resources thereof, but are each associated with a respective user profile, customer, or customer device. As such, a customer (e.g., via a customer device), may, in some cases, request a private blockchain 110 to capture its transactions (via the associated audit logs/event data) in that private blockchain, and not necessarily have event data associated with other customers or customer devices commingled within the same private blockchain 110.

In some embodiments, blockchains such as the private blockchains 110, 112, 114, 116 and other blockchains described herein are distributed databases that comprise multiple blocks of data. At least in the case of private blockchains 110, 112, 114, 116, the blocks may include audit logs or other event data for specified lengths or ranges of time, e.g., as generated by interactions with respective service(s) during that length or range of time. The blocks may also include a timestamp (e.g., of generation of the block), and information linking it to a previous block in the blockchain. This information may include, in some embodiments, a proof of work or other computational evidence reflecting integrity data and/or calculations performed by any entity attempting to add such event data or records to the respective blockchain, e.g., by adding blocks of transactions during a specific period of time to the blockchain.

The blocks of the private blockchains 110, 112, 114, 116, and in some embodiments, those of all blockchains described herein, include groups of one or more sets of data, which can include, depending on the configuration of the specific blockchain, one or more sets of event data (e.g., audit logs) collected over a specified period of time, metadata related to the event data, a proof of work associated with the block's addition, other data (e.g., counters and/or random values used for the calculation of the cryptographic hash), a proof of work associated with the immediately prior-added block in the blockchain (or a link thereto), and the like.

As previously mentioned, blockchains are distributed databases, and in some embodiments, each of a plurality of entities/resources responsible for maintaining the blockchain has a copy of the entirety of the blockchain at any given point (e.g., all blocks added to that point). As individual transactions (e.g., generation of event data) are perpetrated, information regarding those transactions (which may include the event data itself) is broadcasted to all nodes/entities/resources. As a given resource (which may be the same or different than those maintaining the blockchain) "finds" a block that encompasses/includes transactions over a period of time associated with that block (e.g., by finding the first correct hash given the entrance criteria for addition of the block to the blockchain), the contents of the new block are distributed to each node/entity/resource in the blockchain so that, eventually, the blockchain reflects a consistent state.

As may be contemplated, the collection of entities/resources maintaining and/or contributing to the blockchain may be heterogeneous in nature. For example, both customer devices and resources associated with the service can participate in maintaining the blockchain, as well as participate in the computational activity that adds blocks to the blockchain, as the identity of the actor performing the maintenance or addition is largely irrelevant given that all other participating nodes can confirm the integrity and/or veracity of any new added block by simply performing the cryptographic hash function against the block contents to see if the outcome meets the integrity criteria.

The proof of work is, in some embodiments, the outputted hash digest of performing a cryptographic hash function on the contents of a presumptive block to be committed, where some of the data in the block (e.g., a counter, a random number, etc.) is changed repeatedly until the resultant hash digest meets specific criteria set for acceptance of the new block into the blockchain. For example, the blockchain (or implementing system) may require, as a condition for adding a given block to the blockchain, that the hash digest of the presumptive block include a specified number of leading binary or hexadecimal zeros in the outcome, or has a value lower than a specified difficulty value. Such criteria may be tuned or otherwise set to ensure that the number of iterations required of the submitting entity is computationally large or difficult enough to make submissions, and thus back-propagated changes, sufficiently difficult (e.g., as a property of the blockchain, the header of a given block includes the proof of work outcome of the previous block, and thus a proof of work for all blocks after a given block would need to be recalculated in sequence as the resultant value of the computation of the next block would differ if the underlying data was altered after the fact).

These inherent properties of blockchains as implemented above can be tiered to enforce a level of trust not just for event data committed for a given service, but also across multiple services of a given service provider, as well as between service providers. For example, the proofs of work in each block of individual private (e.g., service-specific) blockchain 110, 112, 114, 116, can be "rolled up" into a provider-wide blockchain 118, such that the proofs of work of blocks across multiple services of a service provider created within a specified period of time, or for a specified number of blocks, are themselves populated in a given block of a provider blockchain 118, which may operate similarly to the service (private) blockchains 110, 112, 114, 116 (e.g., by block generation, requirements/criteria involving proofs of work, chaining of blocks, etc.).

Accordingly, any unauthorized changes, corrupt data, incorrect blocks, etc., of any of the private blockchains 110, 112, 114, or 116 would alter the corresponding block of the provider blockchain 118, as well as any subsequent blocks in the provider blockchain 118. As may be contemplated, a simple affirmation of the validity of one or more blocks of the provider blockchain strongly implies that the event data and/or the blocks of any/all of the service (private) blockchains rolled up into the provider blockchain, at least up to the point in time represented by the specific provider blockchain 118 being checked.

In some embodiments, the degree of difficulty associated with the criteria or requirements for event data to be added to blocks, and blocks to be added to a given blockchain, may vary depending on implementation (and in some cases, differ on a per-tier or even per-blockchain basis). For example, if a given set of event data is accompanied with authentication or verification information, such as a cryptographic signature or other attestation as to the validity and/or provenance of the event data, an implementing system may require a low computational difficulty for that event data to be added to the system. In such cases, the signature or other attestation may be provided by a trusted authority, such as a cryptography or authentication service as described in further detail below, and may be verified using, e.g., the issuing service or authority. As may be contemplated, the degree of required difficulty may vary depending on the entity attempting to commit the event data to the blockchain, the nature of the data being added, the assurances provided in connection therewith, tier level or other attribute(s) of the blockchain, and the like.

Figure 2:
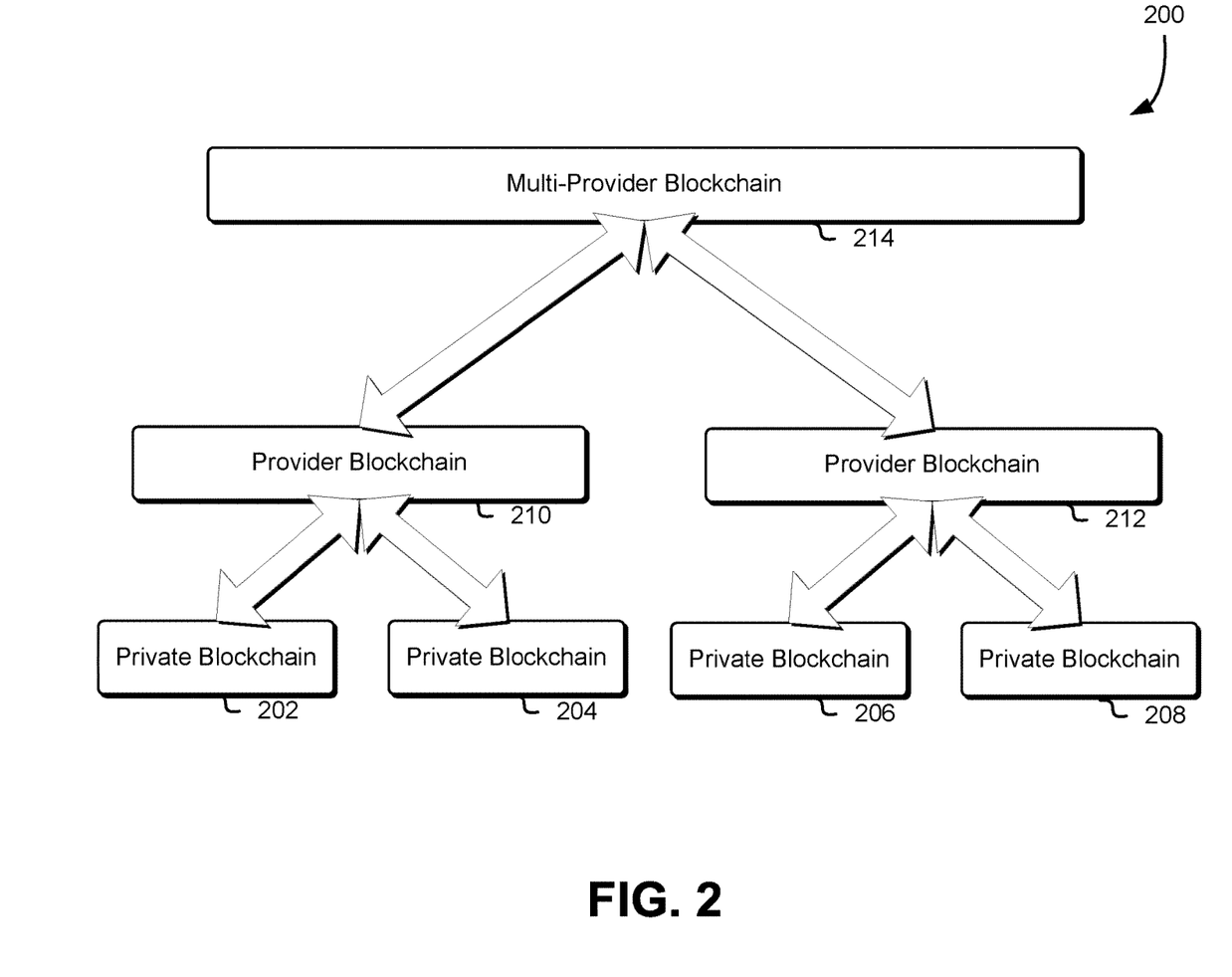
FIG. 2 illustrates a multi-provider environment implementing a multi-provider blockchain across providers generating event data, in accordance with some embodiments.

FIG. 2 illustrates a multi-provider environment implementing a multi-provider blockchain across providers generating event data, in accordance with some embodiments.

A two-tiered blockchain structure is described above in connection with FIG. 1 above. As may be appreciated (and as illustrated in FIG. 2), further tiering of blockchains may be performed across multiple computing service resource providers, so as to provide a higher level of assurance across multiple computing service resource providers, as each computing resource service provider participating in a combined, multi-provider blockchain 214 would have an interest in maintaining the integrity of its respective provider blockchain 210, 212, as well as that of the private blockchains 202, 204, 206, 208 (e.g., associated with services provided by the respective provider) for that respective platform.

In some embodiments, blocks of the provider blockchains 210, 212 include no actual event data, but only a range of digests (or other integrity data) for blocks added to the private blockchains 202, 204 (and 206, 208, in the case of provider blockchain 212) during a given timespan, or every n blocks added across all private blockchains under a given provider blockchain. Similarly, blocks of the multi-provider blockchain 214 may only include the digests of the blocks added to the provider blockchains 210, 212 as their data payload, rather than any event data. However, in some embodiments, the provider blockchains 210, 212 may include some or all of the event data within their own blocks, depending on the implementation.

The multi-provider blockchain 214, the provider blockchains 210, 212, and the private blockchains 202, 204, 206, 208 have, in some embodiments, functionality similar to that described above in connection with FIG. 1. While the distinction between private, provider, and multi-provider blockchains may be split, resource-wise, along service-level, provider-level, and pan-provider-level lines, in some embodiments, such distinctions may be logical rather than physical. As an example, a computing resource service provider may implement a plurality of services that run on similar virtualized computer instances on the same resource or set of resources, some of which may be shared amongst them. Accordingly, while the actual resources implementing the respective services, providers, etc. may be virtualized or otherwise obfuscated, the blockchains themselves may retain a tiered structure and be maintained and added to independently of one another (e.g., each blockchain having different "difficulties" or proof of work requirements, a different cryptographic hash function for some or all of the respective blockchains (whether at the same tier or a different tier), etc.) Additionally, owing to the distributed nature of blockchains generally, any of the described blockchains may be implemented using any appropriate resource. For example, while a given computing resource service provider may provide resources to maintain and update the provider blockchain 210, that same computing resource service provider may also provide resources to the network of nodes responsible for maintaining multi-provider blockchain 214.

Cryptographic hash functions are mathematical functions that map data of arbitrary size to a bit string of a fixed size. The function is one-way or ostensibly one-way (i.e., infeasible or impossible to invert). It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that f(x)=y is below a specified threshold), second preimage resistance (given an input x1, the probability of randomly generating another input x2, different from x1, such that f(x1)=f(x2) is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. Examples include SHA-0, SHA-1, SHA-2, and SHA-3. SHA-2, for example, includes six hash functions that produce digests of fixed bit lengths: SHA-224, SHA-256, SHA-384, SHA-512, SHA-512/224, and SHA-512/256 (224, 256, 384, and 512 bits for the first four; SHA-512/224 and 512/256 use SHA-512 but are truncated and generated in a specific way).

The use of such one-way cryptographic hash functions makes any attempt at altering the event data contained in a blockchain using such functions exceedingly difficult, especially as more blocks are added to any associated blockchain. For example, an unauthorized post hoc alteration of data committed to a given block in, for example, a private blockchain 202 would necessitate a recalculation of the correct digest from that block in the private blockchain 202, but also all blocks after that block within the private blockchain 202, as well as the corresponding blocks (and all subsequent blocks) of the provider blockchain 210, as well as the corresponding blocks (and all subsequent blocks) of the multi-provider blockchain 214. The practical effect, in this example, is that an attacker would need to perform an impractical number of calculations, and take control of a majority of nodes (or at least have sufficient computational capability to generate more than 50% of the blocks across all affected blockchains), to alter the transaction history in a verifiable way as well as force consensus amongst all nodes so as to reconcile the altered transaction history in its favor.

In some embodiments, the act of "rolling up" data from private blockchains into blockchains of higher tiers, e.g., service or provider blockchains, causes anonymization of the event data. The use of one-way cryptographic hash functions, such as SHA-2 (e.g., SHA-256), to calculate the proof of work/digest, effectively obfuscates the data from blockchains in higher tiers of the structure, if the proof of work/digest (and not the event data itself) is used as the data payload within the blocks of the higher blockchains. However, as previously mentioned, some implementations use the event data itself in multiple (or all) tiers of a tiered blockchain structure.

The explicit and implied assurances, as well as the integrity checking functionality, enabled by the use of blockchains (and tiered blockchains) to store or otherwise represent audit logs and other event data is, in some examples, made available to a requestor, such as a customer device. Such exposure may be made by way of an appropriate interface, such as an application programming interface (API), webservice call, user interface, or the like. It will be appreciated that different levels of integrity checks or verification may be made at different tiers of the tiered blockchain structure.

For example, a service may provide an interface, such as an API or UI, where a requestor may validate the provenance and/or the integrity of a given set of event data relevant to that service. In such an example, a requestor may initiate an integrity validation request through the interface, whereupon a resource associated with the service (e.g., a front end or control plane) causes a different resource to validate the appropriate block associated with that set of event data by performing the appropriate calculation, then checking to see if the result/digest meets the criteria set for the blockchain (e.g., does the result contain the requisite number of leading zeros? are the timestamps consistent?). The result is provided through the interface after the assessment is made.

As another example, a computing resource service provider may provider an interface where a requestor may make a more general check of the validity of the service blockchains "rolling up" to it, and thus a broad check of the event data contained therein. The tiered structure of the blockchains allows for the system to merely check the validity of the provider blockchain 210, e.g., all blocks, or simply the block associated with a given set of event data committed to one of the private blockchains 202, 204 (and the blocks subsequent to that block), to draw strongly implied conclusions regarding the validity of any underlying event data. It may be appreciated that the provider may provide a facility where a requestor asks for validity information regarding a specific set of event data, and makes the validity assessment by only verifying the associated block(s) of the provider blockchain 210, which may only contain digests and thus not the actual event data itself. Similarly, a multi-provider blockchain may be exposed directly or indirectly for public scrutiny by multiple computing resource service providers for similar integrity checks.

Figure 3:
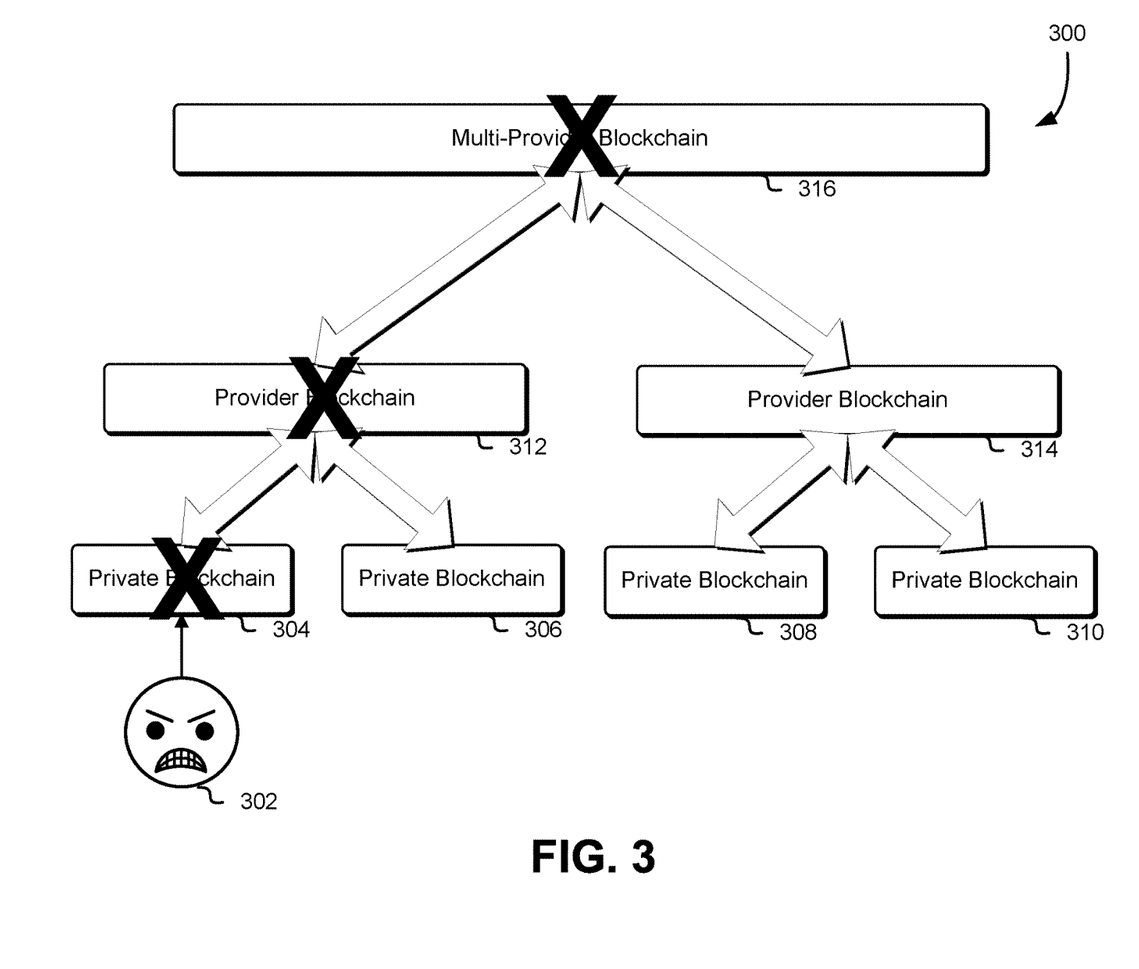
FIG. 3 illustrates an environment implementing a multi-provider blockchain, in which an intruder or other malicious actor attempts to manipulate event data, in accordance with some embodiments.

FIG. 3 illustrates an environment implementing a multi-provider blockchain, in which an intruder or other malicious actor attempts to manipulate event data, in accordance with some embodiments.

The private blockchains 304, 306, 308, 310, the provider blockchains 312, 314, and the multi-provider blockchain 316 are, in some embodiments, similar to that described above in connection with at least FIGS. 1 and 2. In such a tiered implementation, the use of one-way cryptographic hash functions and tiered, interconnected blockchains makes any attempt by an intruder 302 or other actor to alter the event data contained in a given blockchain exceedingly difficult, especially as more blocks are added to any associated blockchain (and as more blockchains are added to the tiered structure).

For example, an unauthorized post hoc alteration of data by a malicious actor 302 committed to a given block in, for example, a private blockchain 304 would cause, via an avalanche effect, a large change in the digest of that block such that it is exceedingly likely that the new digest does not meet the criteria set for that blockchain. Accordingly, the actor 302 would need to recalculate, by brute force, the new digest of the altered block that meets the criteria. However, since the new digest differs from that of the correct original digest from that block in the private blockchain 304, all blocks after that block within the same blockchain 304 would be incorrect and would need to be updated with the new digest, thus necessitating the same brute force method for calculating the new digests for each subsequent block in a cascade.

As the provider blockchain 312 may include the original digests of the private blockchain 304, such digests would also need to be updated (e.g., the data payload of the blocks within the provider blockchain 312), and a recalculation would need to be performed, again in a cascade, of all blocks subsequent to the one corresponding to the altered block in the private blockchain 304. Similarly, all blocks associated with that block in the private blockchain and the provider blockchain 312, and all those subsequent, within the multi-provider blockchain 316 would also need to be recalculated so that the digests meet the criteria set of acceptable proofs of work within the multi-provider blockchain 316.

Additionally, as such calculations would need to be propagated to a majority of nodes within all blockchains (within the service associated with private blockchain 304, within the computing resource service provider resources participating in maintaining the provider blockchain 312, and resources across multiple computing resource service providers participating in maintaining multi-provider blockchain 316), the attacker would need have control over a majority of nodes participating across all affected blockchains so as to reconcile the consistency of the tiered system in favor of the altered version. As can be appreciated, the more intricate and integrated the tiered system is, the more impractical it becomes for an attacker to have the scale and computational capability necessary to perpetrate such an attack.

As a result, a tiered blockchain system may provide, depending on the specific structure and application of the system, one or more assurances to prospective customers of one or more services implementing such a tiered blockchain system for recording event data and other transactional data, of the validity, monotonicity, veracity, provenance, etc. of not only the event data recorded for the services so configured, but also the operation of the services themselves.

Figure 4:
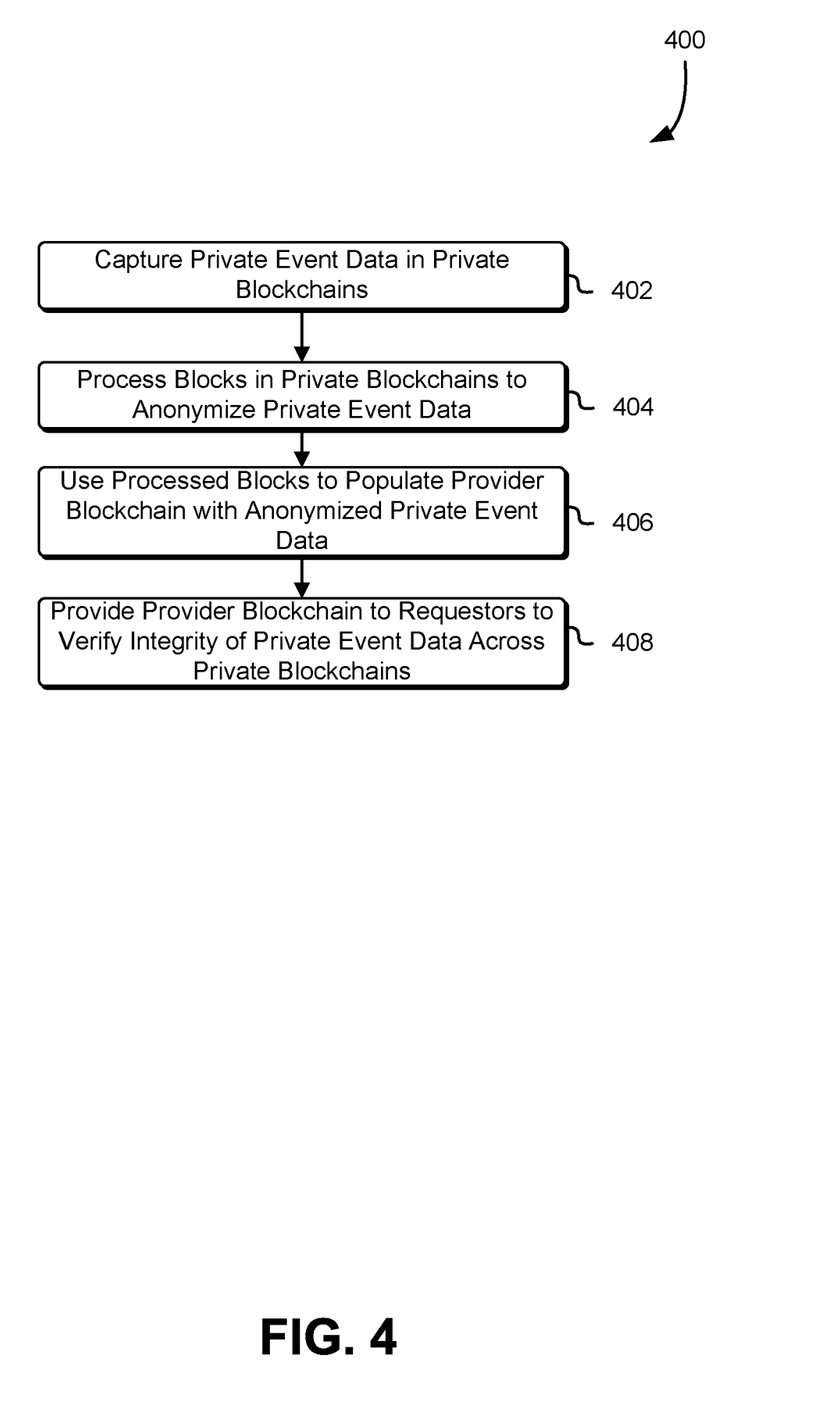
FIG. 4 illustrates an example process for combining private blockchains into a provider blockchain, in accordance with some embodiments.

FIG. 4 illustrates an example process for combining private blockchains into a provider blockchain, in accordance with some embodiments.

At step 402, event data, such as audit logs, are captured, e.g., by services or associated resources of/provided by a computing resource service provider, and committed to one or more private blockchains. As previously mentioned in connection with at least FIGS. 1-3 above, commission of the data to the blocks of the private blockchains may be made in a distributed fashion, e.g., by a set of resources dedicated to maintaining the blockchains, or alternatively, by a set of resources that capture and/or generate the event data in the first instance.

At step 404, an entity, such as resources associated with a blockchain in a higher tier (e.g., a provider blockchain to which the private blockchains "roll up"), process the blocks of the private blockchains to anonymize the event data (e.g., audit logs) contained therein. Such processing may, in some embodiments, include the use of one-way hash functions (e.g., cryptographic hash functions), against the event data. In some embodiments, such process may involve using only the digests (outcomes from applying the cryptographic hash functions on the blocks) as input data into the blocks of the provider blockchain while omitting the event data from the private blockchains.

At step 406, the processed, anonymized data is added to blocks of the provider blockchain. In some embodiments, the addition of such blocks may be performed using similar techniques as the addition of respective blocks to the private blockchains. For example, to add blocks, nodes on the provider blockchain (or outside of it) may perform brute force calculations to solve a computational puzzle, such as finding a digest of a given block that changes an aspect of its contents with each iteration, where the digest must meet specific criteria, that must be solved as a condition for adding the block to the blockchain.

At step 408, the provider blockchain is provided, such as via an API, a webservice call, or a user interface, to requestors seeking to verify the integrity of private event data. As previously discussed, the verification of a specific set of event data may be performed using the anonymized, "roll-up" form in the provider blockchain, and without necessarily accessing the private blockchains themselves. Additionally, also as previously mentioned, the system may also provide a general check of the veracity, validity, provenance, etc. of all services of a given provider, or of a given service, as such attributes may be inferred from the integrity of the roll-up provider blockchain.

Figure 5:
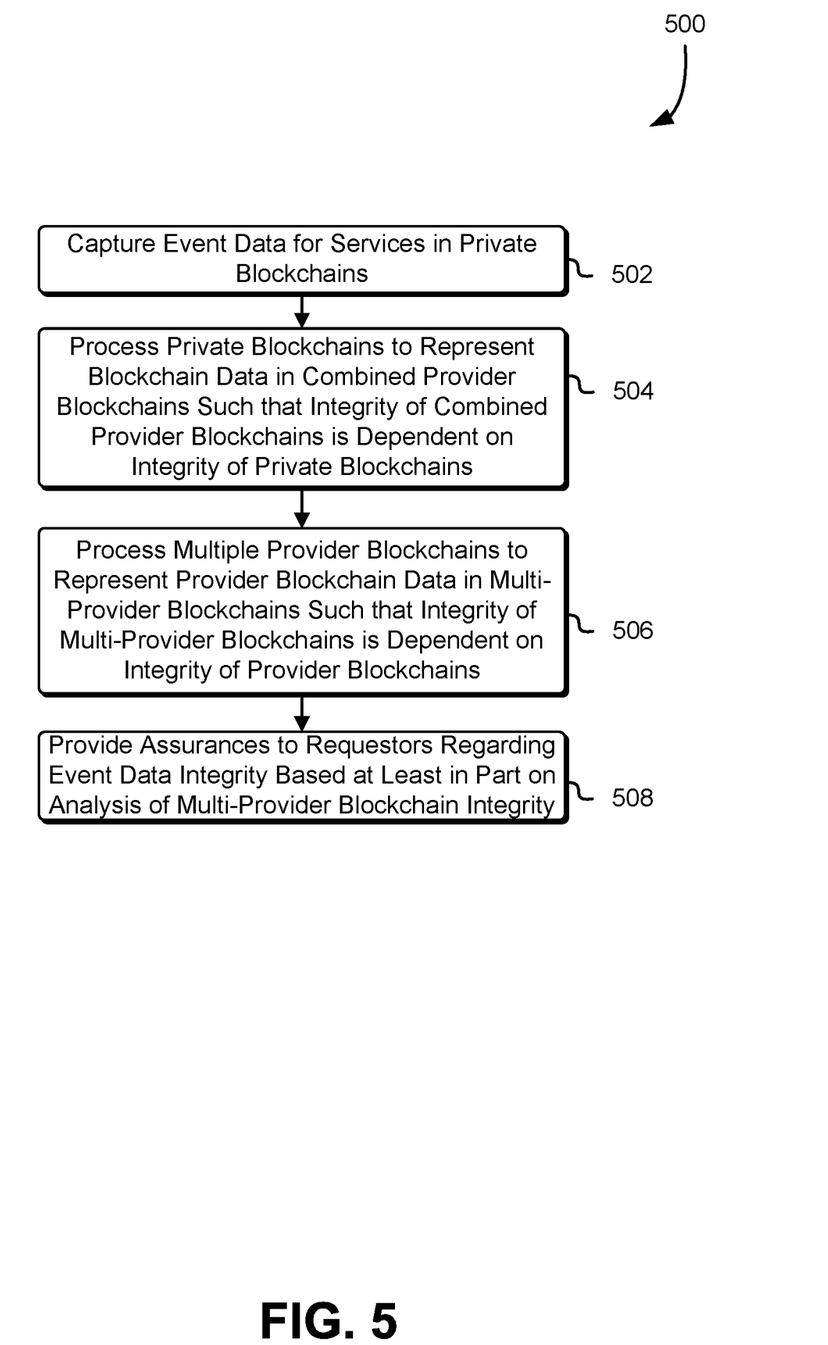
FIG. 5 illustrates an example process for generating and providing a multi-provider blockchain across multiple providers, each of which provide one or more services generating event data, in accordance with some embodiments.

FIG. 5 illustrates an example process for generating and providing a multi-provider blockchain across multiple providers, each of which provide one or more services generating event data, in accordance with some embodiments.

At step 502, event data is captured and committed to one or more blocks of private blockchains, such as those associated with services provided by a computing resource service provider, and as described in connection with FIGS. 1-4 above. At step 504, similarly to step 404 in FIG. 4 above, the private blockchains are processed, e.g., by one or more nodes associated with a provider blockchain, to combine or otherwise represent their respective information (e.g., digest information) into the blocks of a provider blockchain, such that the content and structure of the provider blockchain depends on the content on the structure of the private blockchains that roll up to it.

Similarly, at step 506, multiple provider blockchains are processed to represent data within those blockchains within a multi-provider blockchain, such that the integrity of the multi-provider blockchain is dependent on (and depend from) the content, structure, and integrity of the underlying provider blockchains. At step 508, assurances, verifications, and the like can be made by the implementing system, for lower tiers of blockchains and the services/providers they represent, based at least in part on the integrity, content, and/or structure of the multi-provider blockchain. In some embodiments, such assurances, verifications, etc. are provided as a response to an analysis of the structure, integrity, validity, etc. of the multi-provider blockchain. In some embodiments, such assurances, verifications, etc., are provided as a result of implications drawn from the fact that the multi-provider blockchain exists and is valid.

Figure 6:
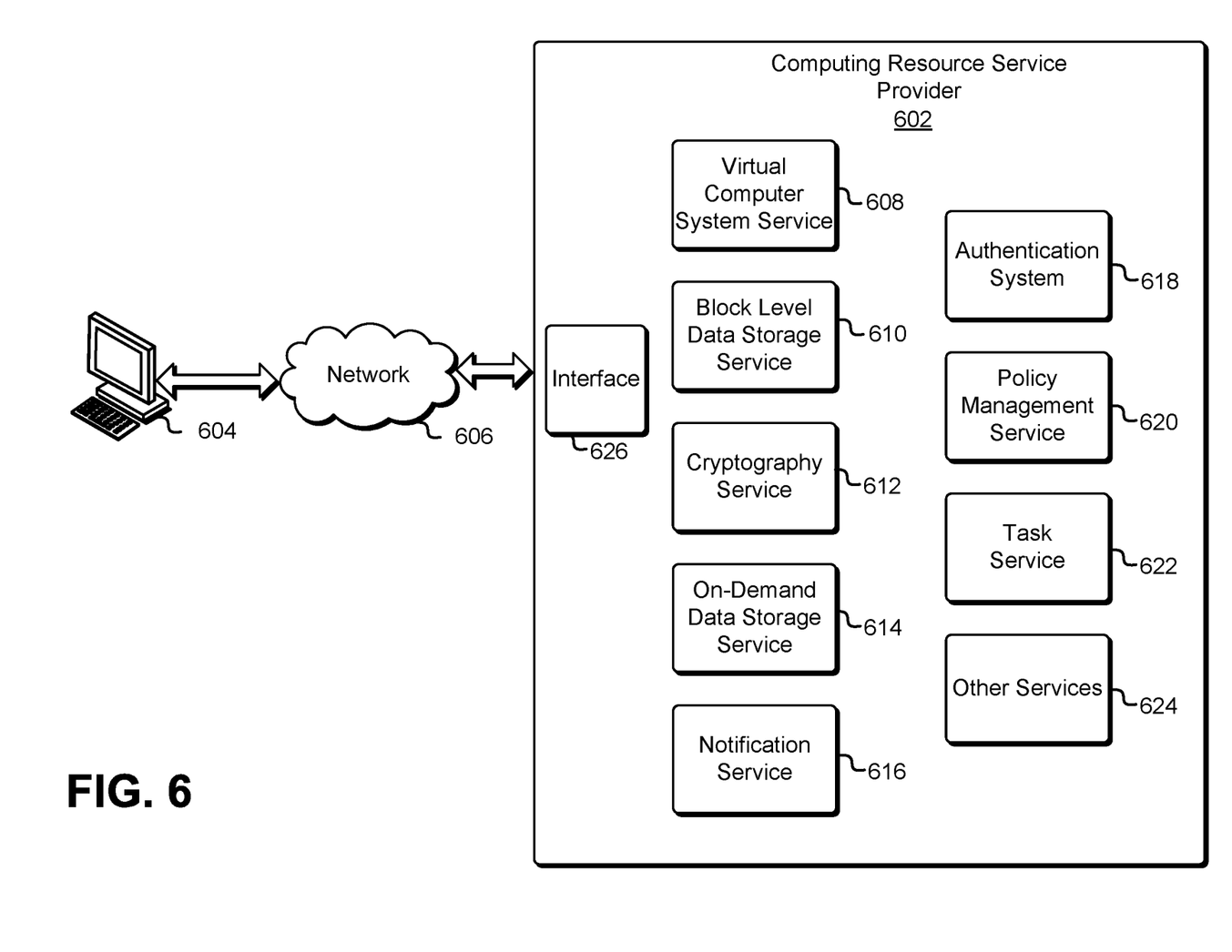
FIG. 6 shows an example of a customer connected to a computing resource service provider in accordance with at least one embodiment.

FIG. 6 shows an example of a customer connected to a computing resource service provider in accordance with at least one embodiment. The computing resource service provider 602 may provide a variety of services to the customer 604 and the customer 604 may communicate with the computing resource service provider 602 via an interface 626, which may be a web services interface or any other type of customer interface. While FIG. 6 shows one interface 626 for the services of the computing resource service provider 602, each service may have its own interface and, generally, subsets of the services may have corresponding interfaces in addition to or as an alternative to the interface 626. The customer 604 may be an organization that may utilize one or more of the services provided by the computing resource service provider 602 to maintain and deliver information to its employees, which may be located in various geographical locations. Additionally, the customer 604 may be an individual that utilizes the services of the computing resource service provider 602 to deliver content to a working group located remotely. As shown in FIG. 6, the customer 604 may communicate with the computing resource service provider 602 through a network 606, whereby the network 606 may be a communication network, such as the Internet, an intranet or an Internet service provider (ISP) network. Some communications from the customer 604 to the computing resource service provider 602 may cause the computing resource service provider 602 to operate in accordance with one or more embodiments described or a variation thereof.

The computing resource service provider 602 may provide various computing resource services to its customers. The services provided by the computing resource service provider 602, in this example, include a virtual computer system service 608, a block-level data storage service 610, a cryptography service 612, an on-demand data storage service 614, a notification service 616, an authentication system 618, a policy management service 620, a task service 622 and one or more other services 624. It is noted that not all embodiments described include the services 608-24 described with reference to FIG. 6 and additional services may be provided in addition to or as an alternative to services explicitly described. As described, each of the services 608-24 may include one or more web service interfaces that enable the customer 604 to submit appropriately configured API calls to the various services through web service requests. In addition, each of the services may include one or more service interfaces that enable the services to access each other (e.g., to enable a virtual computer system of the virtual computer system service 608 to store data in or retrieve data from the on-demand data storage service 614 and/or to access one or more block-level data storage devices provided by the block level data storage service 610).

The virtual computer system service 608 may be a collection of computing resources configured to instantiate virtual machine instances on behalf of the customer 604. The customer 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

The block-level data storage service 610 may comprise one or more computing resources that collectively operate to store data for a customer 604 using block-level storage devices (and/or virtualizations thereof). The block-level storage devices of the block-level data storage service 610 may, for instance, be operationally attached to virtual computer systems provided by the virtual computer system service 608 to serve as logical units (e.g., virtual drives) for the computer systems. A block-level storage device may enable the persistent storage of data used/generated by a corresponding virtual computer system where the virtual computer system service 608 may only provide ephemeral data storage.

The computing resource service provider 602 also includes a cryptography service 612. The cryptography service 612 may utilize one or more storage services of the computing resource service provider 602 to store keys of the customers in encrypted form, whereby the keys may be usable to decrypt the customer 604 keys accessible only to particular devices of the cryptography service 612.

The computing resource service provider 602 further includes an on-demand data storage service 614. The on-demand data storage service 614 may be a collection of computing resources configured to synchronously process requests to store and/or access data. The on-demand data storage service 614 may operate using computing resources (e.g., databases) that enable the on-demand data storage service 614 to locate and retrieve data quickly, to allow data to be provided in response to requests for the data. For example, the on-demand data storage service 614 may maintain stored data in a manner such that, when a request for a data object is retrieved, the data object can be provided (or streaming of the data object can be initiated) in a response to the request. As noted, data stored in the on-demand data storage service 614 may be organized into data objects. The data objects may have arbitrary sizes except, perhaps, for certain constraints on size. Thus, the on-demand data storage service 614 may store numerous data objects of varying sizes. The on-demand data storage service 614 may operate as a key value store that associates data objects with identifiers of the data objects which may be used by the customer 604 to retrieve or perform other operations in connection with the data objects stored by the on-demand data storage service 614.

In the environment illustrated in FIG. 6, a notification service 616 is included. The notification service 616 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 616 may provide notifications to clients using a "push" mechanism without the need to periodically check or "poll" for new information and updates. The notification service 616 may further be used for various purposes such as monitoring applications executing in the virtual computer system service 608, workflow systems, time-sensitive information updates, mobile applications, and many others.

As illustrated in FIG. 6, the computing resource service provider 602, in various embodiments, includes an authentication system 618 and a policy management service 620. The authentication system 618, in an embodiment, is a computer system (i.e., collection of computing resources) configured to perform operations involved in authentication of users of the customer. For instance, one of the services 608-16 and 620-24 may provide information from a user to the authentication system 618 to receive information in return that indicates whether the user requests are authentic.

The policy management service 620, in an embodiment, is a computer system configured to manage policies on behalf of customers (such as customer 604) of the computing resource service provider 602. The policy management service 620 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 602, in various embodiments, is also equipped with a task service 622. The task service 622 is configured to receive a task package from the customer 604 and enable executing tasks as dictated by the task package. The task service 622 may be configured to use any resource of the computing resource service provider 602, such as one or more instantiated virtual machines or virtual hosts, for executing the task. The task service 622 may configure the one or more instantiated virtual machines or virtual hosts to operate using a selected operating system and/or a selected execution application in accordance with a requirement of the customer 604.

The computing resource service provider 602 additionally maintains one or more other services 624 based at least in part on the needs of its customers 604. For instance, the computing resource service provider 602 may maintain a database service for its customers 604. A database service may be a collection of computing resources that collectively operate to run one or more databases for one or more customers 604. The customer 604 may operate and manage a database from the database service by utilizing appropriately configured API calls. This, in turn, may allow a customer 604 to maintain and potentially scale the operations in the database. Other services include, but are not limited to, object-level archival data storage services, services that manage and/or monitor other services.

Figure 7:
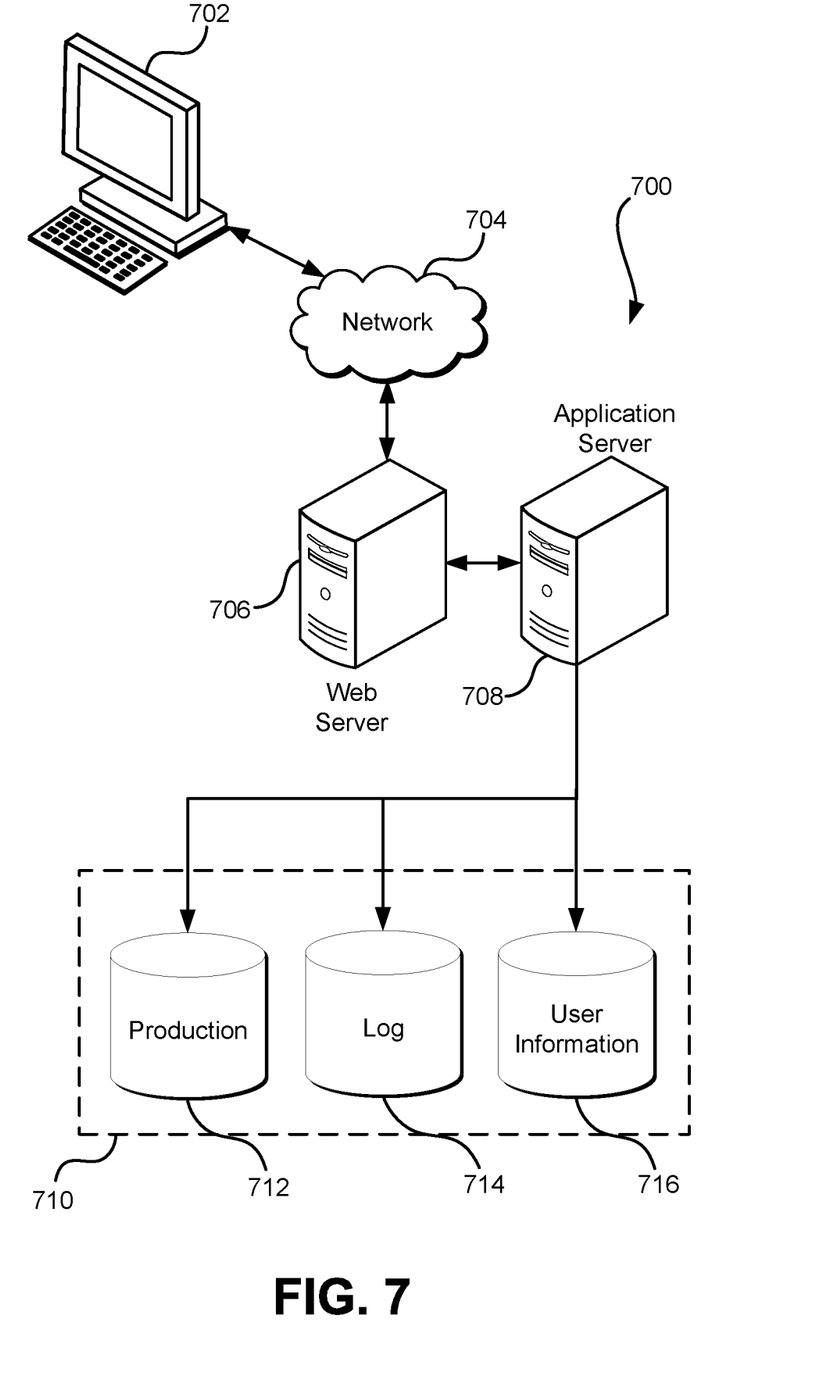
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
generating audit logs pertaining to operations of a computing resource operated in connection with one or more computer systems where information included in the audit logs is anonymized by at least obfuscating the operations of the computing resource included in the audit logs;
committing the audit logs to one or more blocks of a private blockchain, the private blockchain accepting the audit logs on a condition that the audit logs are accompanied with a first proof of work corresponding to a first integrity verification of the audit logs, wherein the first proof of work excludes private data of the audit logs; and
committing data associated with the one or more blocks of the private blockchain to a provider blockchain by at least;
performing a second proof of work by at least generating a second integrity verification of the data based at least in part on a result of determining that the first integrity verification corresponding to the first proof of work is valid; and
as a result of successfully performing the second proof of work, committing the data associated with the one or more blocks of the private blockchain to the provider blockchain; and
providing, to a requestor, one or more integrity assurances for at least a subset of the audit logs based at least in part on generating a confirmation of the second integrity verification.

2. The computer-implemented method of claim 1, wherein the first integrity verification is iteratively generated using a cryptographic hash function until a result meets one or more criteria sets for the private blockchain, the one or more criteria sets such that iterative generation of the first integrity verification is of a specified computational difficulty.

3. The computer-implemented method of claim 1, wherein generating the audit logs pertaining to the operations of the computing resource further include applying a one-way hash function to information included in the audit logs indicating the operations of the computing resource.

4. The computer-implemented method of claim 2, wherein the data includes the first proof of work that obfuscates at least a portion of the data of the private blockchain, where the portion of the data of the private blockchain includes the operations of the computing resource.

5. A system comprising:
one or more processors; and
memory storing instructions that, as a result of execution by the one or more processors, cause the system to:
generate a first blockchain to capture event data, where the event data recorded in the first blockchain is anonymized by at least obfuscating the event data;
process the first blockchain to generate verification data for the first blockchain, the verification data excluding private data within the event data; and
cause the verification data for the first blockchain to be committed to one or more blocks of a second blockchain by at least;
generating an integrity verification of the event data by at least verifying the verification data corresponding to the first blockchain; and
committing the verification data to the second blockchain as a result of verifying the verification data.

6. The system of claim 5, wherein the integrity verification of the event data is verified by inclusion of a first proof of work indicating completion of a first set of one or more cryptographic computations.

7. The system of claim 6, wherein the integrity verification of the event data committed to the second blockchain is verified by inclusion of a second proof of work indicating completion of a second set of one or more cryptographic computations.

8. The system of claim 7, wherein the first set of one or more cryptographic computations involves a first cryptographic hash function and the second set of one or more cryptographic computations involves a second cryptographic hash function.

9. The system of claim 6, wherein the integrity verification of the event data is verified by authenticating the event data via inclusion of a digital signature as a condition for inclusion in the one or more blocks of the second blockchain.

10. The system of claim 9, wherein inclusion of the digital signature reduces a required difficulty of the first set of the one or more cryptographic computations to be completed, relative to exclusion of the digital signature.

11. The system of claim 5, wherein the event data includes audit logs generated from operations associated with one or more services.

12. The system of claim 11, wherein the memory further includes instructions that, as a result of execution by the one or more processors, cause the system to process the one or more blocks of the first blockchain by including at least a proof of work submitted with the audit logs and included in the one or more blocks of the second blockchain.

13. A non-transitory computer-readable storage medium storing thereon executable instructions that, as a result of being executed by one or more processors of a computer system, cause the computer system to at least:
configure a multi-provider blockchain to accept blockchain data on a condition that the blockchain data includes verification information indicating integrity of the blockchain data;
cause a plurality of providers to generate blockchain data excluding private data of event data by at least obfuscating the private data prior to recording the event data in the multi-provider blockchain in order to anonymize the private data, each provider of the plurality of providers generating a respective portion of the blockchain data, at least one respective portion of the blockchain data being associated with a respective private blockchain of a plurality of private blockchains that, by virtue of including the event data within the respective private blockchain, provides verification of integrity of the event data based at least in part on a first proof of work included in the at least one respective portion of the blockchain data, where the verification of integrity of the event data includes a second proof of work generated based at least in part on a result of verifying the verification information associated with the first proof of work;
cause the plurality of providers to submit blockchain data associated with the respective private blockchain for addition to the multi-provider blockchain;
generate the verification information based at least in part on the blockchain data; and
provide an indication regarding integrity of the blockchain data based at least in part on an outcome of storing the blockchain data in the multi-provider blockchain.

14. The non-transitory computer-readable storage medium of claim 13, wherein the verification information includes one or more outputs of a hash function as computed against one or more blocks of at least a subset of the plurality of private blockchains.

15. The non-transitory computer-readable storage medium of claim 14, wherein the one or more blocks of the subset of the plurality of private blockchains include one or more outputs of an integrity check of at least a portion of the plurality of private blockchains.

16. The non-transitory computer-readable storage medium of claim 13, wherein the plurality of private blockchains is associated with operation of one or more services provided by the plurality of providers.

17. The non-transitory computer-readable storage medium of claim 13, wherein the verification information is generated using at least a cryptographic hash function.

18. The non-transitory computer-readable storage medium of claim 13, wherein the instructions that cause the system to cause the plurality of providers to generate the blockchain data further include instructions that, as a result of being executed by the one or more processors of the computer system, cause the computer system to cause the plurality of providers to anonymize event data included in the blockchain data prior to generating the blockchain data by at least deleting sensitive information.

19. The non-transitory computer-readable storage medium of claim 13, wherein the indication is provided via an application programming interface provided by the computer system.

20. The non-transitory computer-readable storage medium of claim 13, wherein the outcome of storing the blockchain data is a verification of a proof of work associated with the storing of the blockchain data.

* * * * *